(12) United States Patent
Lesser et al.

(10) Patent No.: US 8,455,096 B2
(45) Date of Patent: Jun. 4, 2013

(54) REINFORCED POLYMERIC MATERIALS, METHODS OF MANUFACTURE THEREOF AND ARTICLES COMPRISING THE SAME

(75) Inventors: Alan J. Lesser, Sunderland, MA (US); Thomas J. McCarthy, Amherst, MA (US); Joonsung Yoon, Amherst, MA (US); Onur S. Yordem, Amherst, MA (US)

(73) Assignee: The University of Massachusetts, Boston, MA (US)

( * ) Notice: Subject to any disclaimer, the term of this patent is extended or adjusted under 35 U.S.C. 154(b) by 102 days.

(21) Appl. No.: 12/057,850

(22) Filed: Mar. 28, 2008

(65) Prior Publication Data

US 2008/0268239 A1  Oct. 30, 2008

Related U.S. Application Data

(60) Provisional application No. 60/908,570, filed on Mar. 28, 2007.

(51) Int. Cl.
*G11B 9/00* (2006.01)
*G11B 5/66* (2006.01)

(52) U.S. Cl.
USPC ...................................... 428/338; 428/832.4

(58) Field of Classification Search
USPC .............. 525/333.7, 63, 70, 88, 92; 260/87.3; 430/130, 135; 252/500; 428/338, 832.4
See application file for complete search history.

(56) References Cited

U.S. PATENT DOCUMENTS

| | | | |
|---|---|---|---|
| 3,933,772 A | | 1/1976 | Takahashi et al. |
| 4,018,602 A | * | 4/1977 | Chu ............................... 430/130 |
| 2006/0188573 A1 | * | 8/2006 | Imberg .......................... 424/468 |
| 2007/0185264 A1 | * | 8/2007 | Seo ................................. 525/63 |

FOREIGN PATENT DOCUMENTS

EP  1239005  * 9/2002

OTHER PUBLICATIONS

XP002923902, Zhao, et al., "Nonionic Triblock and Star Diblock Copolymer and Oligomeric Surfactant Synteses of Highly Ordered, Hydrothermally Stable, Mesoporous Silica Structures," J. A. Chem. Soc., vol. 120, pp. 6024-6036 (1998).
PCT International Search Report, International Application No. PCT/US2008/058618, Date of Mailing: Mar. 9, 2008.
PCT Written Opinion of ISA, International Application No. PCT/US2008/058618, Date of Mailing: Mar. 9, 2008.

* cited by examiner

*Primary Examiner* — Ling Choi
(74) *Attorney, Agent, or Firm* — Cantor Colburn LLP (57) ABSTRACT

Disclosed herein is a polymeric composite comprising a first organic polymer that forms a first organic polymer phase; and a low molecular weight compound that exists in the form of a second crystalline phase; wherein the second crystalline phase is dispersed within the first organic polymer phase. Disclosed herein too is a polymeric composite comprising a first organic polymer that forms a first organic polymer phase; and a second phase that comprises a crystalline organic polymer, wherein the crystalline organic polymer has a different molecular structure from the first organic polymer; wherein the second phase is not covalently bonded to the first organic polymer phase and wherein the second phase has an average particle size of about 1 to about 20 micrometers.

17 Claims, 11 Drawing Sheets

Orientation of the crystal face on fibers

REINFORCED POLYMERIC MATERIALS, METHODS OF MANUFACTURE THEREOF AND ARTICLES COMPRISING THE SAME

CROSS-REFERENCE TO RELATED APPLICATIONS

This application claims priority to provisional application 60/908,570 filed on Mar. 28, 2007, the entire contents of which are hereby incorporated by reference.

BACKGROUND

This disclosure relates to reinforced polymeric materials, methods of manufacture thereof and articles comprising the same.

The mechanical and rheological properties of organic polymers can be altered by the addition of a second phase that can be miscible or immiscible with the organic polymer. Increasing the impact toughness of organic polymers has generally been accomplished by several different methods.

One method of improving the toughness comprises producing a composite by incorporating a second phase into the organic polymer matrix so as to increase the tortuousity of the crack trajectory. The second phase generally is softer than the organic polymer. Another method is to develop crack wake mechanisms like crack bridging and crack pinning. Yet another method involves developing crack front mechanisms that absorb energy and delocalize the stresses at the crack tip.

As noted above, one universal method for improving the impact strength and fracture toughness of organic polymers has been to produce a composite by dispersing soft organic polymeric particles having a particle sizes of about 0.1 micrometers to about 10 micrometers into a higher-modulus organic polymer matrix. The soft organic polymeric particles are commonly added in concentrations of about 5 to about 20 volume percent, based upon the properties of the soft particles, the organic polymer matrix, and the interface properties.

When the local stresses in front of the propagating crack tip becomes excessive, the soft particles either cavitate or disbond from the organic polymer matrix prior to fracture. The cavitation or disbanding, in turn, locally relieves hydrostatic stresses in the composite and allows for yielding and inelastic flow to occur in the organic polymer matrix. Both the cavitation process and the subsequent flow of the organic polymer matrix facilitate energy dissipation with the majority of energy dissipation occurring due to the matrix flow. This macroscopically alters the failure mode from a brittle to a ductile process that consumes energy and avoids a catastrophic fragmentation of the organic polymer matrix. This method is generally used to toughen organic polymers for applications ranging from sports equipment to automotive and aerospace applications. The drawback to this strategy is that the modulus of the organic polymer is decreased by the introduction of the soft particles. In addition, the process viscosity undergoes a change due to the addition of the soft particles. This change in process viscosity limits the ability to put in other reinforcements or additives. In order to offset these drawbacks, systems are often optimized to develop the best balance of properties for specific applications. There are no organic polymer compositions that combine a low melt viscosity with improved toughness and an increased elastic modulus.

It is therefore desirable to have a polymeric composite that can display a low melt viscosity, high impact strength, and a high elastic modulus.

SUMMARY

Disclosed herein is a polymeric composite comprising a first organic polymer that forms a first organic polymer phase; and a low molecular weight compound that exists in the form of a second crystalline phase; wherein the second crystalline phase is dispersed within the first organic polymer phase.

Disclosed herein too is a polymeric composite comprising a first organic polymer that forms a first organic polymer phase; and a second phase that comprises a crystalline organic polymer, wherein the crystalline organic polymer has a different molecular structure from the first organic polymer; wherein the second phase is not covalently bonded to the first organic polymer phase and wherein the second phase has an average particle size of in the range between approximately 0.1 and about 20 micrometers.

Disclosed herein too is a method comprising blending a first organic polymer with a low molecular weight compound to form a polymeric composite; phase separating the low molecular weight compound from the first organic polymer; wherein after the phase separation the low molecular weight compound forms a second phase and wherein the first organic polymer forms a first organic polymer phase; and crystallizing the second phase.

Disclosed herein too is a method comprising blending a first organic polymer with a low molecular weight compound to form a polymeric composite; polymerizing a low molecular weight compound to form a second organic polymer; phase separating the second organic polymer from the first organic polymer; wherein the second organic polymer forms a second polymer phase and wherein the first organic polymer forms a first organic polymer phase; and crystallizing the second phase.

Disclosed herein too is a method comprising blending a polymerizable monomer or compound and curing agent and/or catalyst together with another crystallizable low molecular weight compound whereby polymerizing the monomer or compound forces phase separation of the crystallizable compound to produce reinforcing particles in the size range of 0.1 to 20 microns to produce a toughened composite.

Disclosed herein too is a method to generate polymeric composites containing reinforcements that are anisotropic in shape and can resemble fibers and other shapes arising from compounds forming crystallographic structures in the forms of fibers. These reinforcements are commonly generated at higher concentrations of the low molecular weight crystallizable compound.

BRIEF DESCRIPTION OF FIGURES

FIG. 1 compares the tensile strength and the tensile modulus for the polymeric composites that comprise high density polyethylene (IP-60) and selected low molecular weight compounds when tested as per ASTM D 638.

DETAILED DESCRIPTION

Disclosed herein is a toughened polymeric composite that comprises a first organic polymer phase into which is dispersed a second phase that comprises crystallites. The first organic polymer phase and the second phase are not covalently bonded to each other. The first organic polymer phase generally comprises a first organic polymer that constitutes the matrix of the polymeric composite. In one embodiment, the second phase comprises a low molecular weight compound that can undergo crystallization. The second phase is dispersed throughout the first organic polymer. In another embodiment, the second phase can comprise a polymer precursor that can be crystallized after undergoing polymerization.

The second phase upon undergoing crystallization causes the polymeric composite to become tougher than it was prior to the introduction of the second phase. Crystallization of the second phase also permits the development of a higher elastic modulus in the polymeric composite when compared to an unmodified polymeric material that contains only the first organic polymer phase. In addition, the presence of the second phase permits the melt viscosity of the polymeric composite to be lower than the melt viscosity of the first organic polymer at a given temperature because the low molecular weight compound crystals are in a molten phase at the given temperature. This facilitates efficient melt processing of the polymeric composite.

Disclosed herein too is a method of manufacturing a polymeric composite that comprises mixing the first organic polymer with the low molecular weight compound. The polymeric composite may then optionally be subjected to conditions effective to promote the phase separation of the low molecular weight compound into the second phase. The second phase can then be crystallized to form a toughened polymeric composite. Alternatively, the second phase can be polymerized and then crystallized to form a toughened polymeric composite. The low molecular weight compound of the second phase upon undergoing polymerization is not covalently bonded to the first organic polymer. The polymer present in the second phase generally has a different chemical structure from the first organic polymer.

The first organic polymer used in the first organic polymer phase can be either semi-crystalline or amorphous. The first organic polymer can be selected from a wide variety of thermoplastic polymers, blends of thermoplastic polymers, thermosetting polymers, blends of thermosetting polymers, or blends of thermoplastic polymers with thermosetting polymers. In one embodiment, the first organic polymer can be a blend of polymers, copolymers, terpolymers, or combinations comprising at least one of the foregoing organic polymers. In another embodiment, the first organic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing organic polymers.

Suitable examples of the first organic polymers include polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polytetrafluoroethylene, fluorinated ethylene propylene, perfluoroalkoxyethylene, polychlorotrifluoroethylene, polyvinylidene fluoride, or the like, or a combination comprising at least one of the foregoing organic polymers.

Examples of blends of thermoplastic resins include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like.

Examples of thermosetting resins include polyurethane, natural rubber, synthetic rubber, epoxy, phenolic, polyesters, polyamides, silicones, or the like, or a combination comprising at least one of the foregoing thermosetting resins. Blends of thermoset resins as well as blends of thermoplastic resins with thermosets can be utilized.

It is desirable for the first organic polymer used in the first organic polymer phase to have 350 or more repeat units per molecule, specifically 400 or more repeat units per molecule, more specifically 500 or more repeat units per molecule, and even more specifically 1,000 or more repeat units per molecule.

It is generally desirable for the first organic polymer to have a number average molecular weight of greater than or equal to about 10,000 grams per mole (g/mole), specifically greater than or equal to about 20,000 g/mole, more specifically greater than or equal to about 25,000 g/mole, and more specifically greater than or equal to about 30,000 g/mole.

The first organic polymer used in the toughened polymeric composite generally used in amounts of about 70 to about 98 weight percent (wt %), of the total weight of the toughened polymeric composite. The first organic polymer is generally used in amounts of greater than or equal to about 73, specifically greater than or equal to about 75, and more specifically greater than or equal to about 80 wt %, of the total weight of the toughened polymeric composite. The first organic polymer is furthermore generally used in amounts of less than or equal to about 95, specifically less than or equal to about 90, and more specifically less than or equal to about 88 wt %, of the total weight of the toughened polymeric composite.

It is generally desirable for the low molecular weight compound of the second phase to comprise about 1 to about 100 repeat units, specifically about 2 to about 50 repeat units, and more specifically about 3 to about 25 repeat units. In one embodiment, the low molecular weight compound is a monomer, dimer, trimer, tetramer or a pentamer that is capable of existing in the crystalline form at room temperature.

The dispersed phase generally comprises a low molecular weight compound that is either miscible or immiscible with the first organic polymer. As noted above, the first organic polymer is mixed with the low molecular weight compound to form the polymeric composite at a first set of ambient conditions. In one embodiment, at an elevated process temperature of the continuous phase polymer, the low-molecular weight crystallizable compound melts and assists in the processability of the polymer. In this condition, the low molecular weight compound can be either miscible or immiscible. Upon cooling of the first organic polymer phase and the low molecular weight compound, the low molecular compound undergoes phase separation from the first organic polymer phase to form the second dispersed phase. The second dispersed phase may also undergo crystallization at the first set of ambient conditions or at a second set of ambient conditions to yield a higher-modulus, toughened polymeric composite.

If the dispersed phase does not undergo crystallization at the second set of ambient conditions, then the ambient conditions may be changed once again to a third set of ambient conditions, at which the second phase undergoes crystallization thereby facilitating a toughening of the polymeric composite. In an exemplary embodiment, the temperature of the polymeric composite is generally lowered to facilitate the phase separation of the second phase from the first organic polymer as well as to facilitate the development of crystallites in the second dispersed phase. The temperature is generally lowered to below the melting point of the low molecular weight compound. This is generally termed temperature induced phase separation.

In another exemplary embodiment, the low molecular weight crystallizable compound is a dissolved into a polymer precursor (e.g., monomer and catalyst, resin and curing agent). Upon polymerization of the polymer precursor to form the first organic polymer, the low molecular weight crystallizable compound, undergoes phase separation to form a dispersed second phase that leads to a reinforced, toughened polymeric composite. This is generally termed reaction induced phase separation. After the formation of the second phase, the polymeric composite may be subjected to another set of ambient conditions that are effective to promote crystallization of the second phase.

In yet another exemplary embodiment, the low molecular weight compound is first phase separated from the first organic polymer to form the second phase. Following the formation of the second phase, the low molecular weight compound is polymerized to form a polymerized second phase. The polymerized second phase is then subjected to ambient conditions that are effective to promote crystallization in the second phase.

In yet another exemplary embodiment, a plurality of low molecular weight compounds may be mixed with the first organic polymer to form the second phase, a third phase, a fourth phase, and the like. In one embodiment, a second low molecular weight compound is mixed with the first organic polymer to form the third phase while a third low molecular weight compound may be added to the first organic polymer to form the fourth phase. The various low molecular weight compounds may be added to the first organic polymer either simultaneously or sequentially. The polymeric composite may then be subjected to ambient conditions that are effective to crystallize one or more of the plurality of low molecular weight compounds.

In one embodiment, the polymeric composite may be subjected to ambient conditions that are effective to facilitate a polymerization one or more of the plurality of low molecular compounds to form the second phase, the third phase, the fourth phase, and the like. In another embodiment, the polymeric composite may then be subjected to ambient conditions that are effective to crystallize one or more of the plurality of low molecular weight compounds. Alternatively, the polymeric composite may be subjected to ambient conditions (or a set of ambient conditions) that are effective to polymerize some of the phases, while the remaining phases are volatilized and extracted from the polymeric composite. In other words, a first low molecular weight compound may be added to the first organic polymer only for purposes of facilitating the blending of a second low molecular weight compound into the first organic polymer. After the blending is successfully accomplished, the first low molecular weight compound is extracted, leaving behind a polymeric composite comprising the first organic polymer and the second low molecular weight compound. The second low molecular weight compound is then subjected to a set of ambient conditions that are effective to promote phase separation and crystallization of the second phase.

It is generally desirable for the second phase to exist in crystalline form at temperatures of about 20 to about 200° C., specifically about 25 to about 150° C. In an exemplary embodiment, it is desirable for the second phase to exist in crystalline form at room temperature. The average size of the crystallites should be about 0.05 to about 20 micrometers, specifically about 0.5 to about 15 micrometers, and more specifically about 1 to about 10 micrometers for effective toughening. Other benefits including enhanced modulus, strength, and lower coefficient of thermal expansion may be realized with crystalline domains much larger and even anisotropic in nature.

The low molecular weight compound (that forms the crystalline second phase) is generally used in amounts of about 2 to about 30 weight percent (wt %), of the total weight of the polymeric composite. The low molecular weight compound is generally used in amounts of greater than or equal to about 3, specifically greater than or equal to about 5, and more specifically greater than or equal to about 10 wt %, of the total weight of the polymeric composite. The low molecular weight compound is furthermore generally used in amounts of less than or equal to about 28, specifically less than or equal to about 25, and more specifically less than or equal to about 23 wt %, of the total weight of the polymeric composite.

In another embodiment, it is desirable for the low molecular weight compound in its crystalline form to display limited adhesion to the first organic polymer phase. In other words, it is desirable for the interface between the crystalline second phase (formed by the crystallization of the low molecular weight compound) and the first organic polymer phase to be relatively weak so that at service loads in the material (e.g., relatively low loads), the polymeric composite displays an increased elastic modulus over an organic polymer that does not contain the crystallized low molecular weight compound. In addition, the polymeric composite displays an increased elastic modulus over a comparative commercially available polymeric composite that has been impact modified with an elastomeric impact modifier to the same weight percent.

However, when an excessively high load (corresponding to a stress level higher than that obtained during normal service loads but lower than the yield or strength of the unmodified polymer) is applied to the polymeric composite, interfacial de-bonding between the second dispersed phase and the first organic polymer phase occurs thereby providing relief from hydrostatic stresses in a manner similar to the rubber cavitation processes described above. As a result of this, the polymeric composite has both an increased tensile modulus as well as an increased impact strength when compared with organic polymers that are not reinforced with the crystalline low molecular weight compounds.

The low molecular weight compounds can be organic compounds or inorganic compounds. Examples of suitable low molecular weight compounds can be pyrene, bisphenol A, brominated bisphenol A, phthalic anhydride, dimethyl terephthalate, hexamethylbenzene, or the like, or a combination comprising at least one of the foregoing low molecular weight compounds.

Additional examples of low molecular weight compounds can be high temperature ionic liquids like ethyltriphenylphosphonium iodide, which has a melting point of 169-171° C.

In one embodiment, in one method of manufacturing the polymeric composite, the first organic polymer is first blended with the low molecular weight compound. Blending can include melt blending, solution blending, or the like, or combinations comprising at least one of the foregoing methods of blending. Melt blending of the polymeric composite involves the use of shear force, extensional force, compressive force, or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneaders, Henschel mixers, helicones, Ross mixers, Banbury mixers, roll mills, molding machines such as injection molding machines, vacuum forming machines, blow molding machines, or the like, or combinations comprising at least one of the foregoing machines.

In one embodiment, the first organic polymer in powder form, pellet form, sheet form, or the like, may be first dry blended with the low molecular weight compound in a Henschel or in a roll mill, prior to being fed into a melt blending device such as an extruder or Buss kneader.

It may be desirable to introduce the low molecular weight compound into the melt blending device in the form of a masterbatch. In such a process, the masterbatch may be introduced into the melt blending device downstream of the point where the first organic polymer is introduced.

A melt blend is one where at least a portion of the first organic polymer has reached a temperature greater than or equal to about the melting temperature, if the first organic polymer is a semi-crystalline organic polymer, or the flow point (e.g., the glass transition temperature) if the first organic polymer is an amorphous polymer during the blending process. A dry blend is one where the entire mass of the first organic polymer is at a temperature less than or equal to about the melting temperature if the polymer is a semi-crystalline organic polymer, or at a temperature less than or equal to the flow point if the first organic polymer is an amorphous polymer. A solution blend, as defined herein, is one where the first organic polymer is suspended in a liquid-like fluid such as, for example, a solvent or a non-solvent during the blending process.

The polymeric composite comprising the first organic polymer and the low molecular weight compound may be subject to multiple blending and forming steps if desirable. For example, the polymeric composition may first be extruded and formed into pellets. The pellets may then be fed into a molding machine where it may be formed into any desirable shape or product. Alternatively, the polymeric composite emanating from a single melt blender may be formed into sheets or strands and subjected to post-extrusion processes such as annealing, uniaxial or biaxial orientation.

Solution blending may also be used to manufacture the polymeric composite. The solution blending may also use additional energy such as shear, compression, ultrasonic vibration, or the like, to promote homogenization of low molecular weight compound or the plurality of low molecular weight compounds with the first organic polymer. In one embodiment, the first organic polymer suspended in a fluid may be introduced into an ultrasonic sonicator along with low molecular weight compounds. The mixture may be solution blended by sonication for a time period effective to disperse low molecular weight compounds onto the organic polymer particles. The first organic polymer along with low molecular weight compounds may then be dried, extruded and molded if desired. It is generally desirable for the fluid to swell the organic polymer during the process of sonication. Swelling the first organic polymer generally improves the ability of low molecular weight compounds to impregnate the organic polymer during the solution blending process and consequently improves dispersion.

Swelling of the first organic polymer can be accomplished by using low molecular weight compounds that are solvents for the first organic polymer. Water, supercritical fluids such as supercritical carbon dioxide, volatile organic compounds such as acetone, methyl ethyl ketone, alcohols, or the like, may be used to swell the first organic polymer.

The polymeric composite displays advantageous melt flow properties. In one embodiment, the polymeric composite has a melt flow index that is at least 10% lower, specifically at least 20% lower, and more specifically at least 50% lower than the organic polymer without the low molecular weight compound.

The polymeric composite also displays improved mechanical properties over the organic polymer without the low molecular weight compound. In one embodiment, the tensile strength at break is improved in an amount of greater than or equal to about 10%, specifically greater than or equal to about 20%, and more specifically greater than or equal to about 50% over the organic polymer without the low molecular weight compound.

In one embodiment, the elongation at break is improved in an amount of greater than or equal to about 10%, specifically greater than or equal to about 100%, and more specifically greater than or equal to about 200% over the organic polymer without the low molecular weight compound.

In one embodiment, the elastic modulus is improved in an amount of greater than or equal to about 10%, specifically greater than or equal to about 20%, and more specifically greater than or equal to about 30% over the organic polymer without the low molecular weight compound.

The toughened polymeric composite displays advantageous impact properties. In one embodiment, the notched Izod impact strength of the toughened polymeric composite is increased in an amount of about 10%, more specifically in an amount of about 300%, and even more specifically in an amount of about 500% over the first organic polymer.

The toughened polymeric composite also displays improved flame retardant properties. In one embodiment the polymeric composite can meet the requirements of Underwriter Laboratories 94 (UL-94) flame retardancy tests. The composition can display a flame retardancy of greater than or equal to about V-2 at a thickness of greater than or equal to about 1.6 millimeters.

In one embodiment, the toughened polymeric composite displays a better barrier resistance to permeation by gases such as air, oxygen, carbon dioxide, nitrogen, or the like when compared with the first organic polymer. In another embodiment, the toughened polymeric composite displays a lower coefficient of thermal expansion when compared with the first organic polymer. In yet another embodiment, the toughened polymeric composite displays superior transparency and reduced haze over the first organic polymer.

In one embodiment, the composite will also show a lower coefficient of thermal expansion due to the introduction of the crystalline dispersed second phase when compared with an organic polymer that does not contain the crystalline dispersed second phase.

In one embodiment, the composite will also show a reduction of permeability to gases or liquids due to the introduction of the crystalline dispersed second phase when compared with an organic polymer that does not contain the crystalline dispersed second phase.

The invention is further illustrated by the following non-limiting examples.

EXAMPLES

Example 1

This example was conducted to demonstrate the effect of the addition of a crystalline low molecular weight compound to an organic polymer. The organic polymer was a commercially available polyethylene (IP-60 manufactured by Dow Chemical Co.) having a melting point of 128° C. and a density of 0.947 g/cm$^3$. The low molecular weight compounds that were added to the polyethylene were bisphenol A, brominated bisphenol A, phthalic anhydride or pyrene.

The organic polymer and the particular low molecular weight compound were mixed at 200° C., which is higher than the melting point of the both the organic polymer and the low molecular weight compound using a single screw extruder operated at 20 revolutions per minute (rpm). The screw had a length to diameter ratio of 25. The extruder is a C.W. Brabender laboratory extruder with a ¾ inch single screw. Hot extrudate was rapidly quenched in a cooling water bath (~20° C.) to prevent macroscopic phase separation.

Each sample was chopped and weighed into a mold for compression molding. The samples were compression molded at a temperature of 200° C. using a pressure of 3700 pounds per square inch (psi) for 5 minutes, followed by cooling at about 30° C./min while being under the pressure of 3700 psi. The samples were then subjected to impact testing, density testing, differential scanning calorimetry, tensile testing to determine their properties.

The tensile tests were conducted as per ASTM D 638. The tensile specimens were prepared by using compression punch having the requisite dog bone shape. Strain rate was 10 mm/min Tensile tests were performed on an Instron 5500R with a 50 kiloNewton (kN) load cell at an initial strain rate of 1 millimeter (mm)/mm/60 seconds. Strain was calculated by dividing extension of the entire specimen by the initial gauge length (7.62 mm). The elastic modulus was calculated in the strain range of up to 2% strain.

The fracture toughness test was carried out according to ASTM D 5045-99. Single end notched bend (SENB) specimens were used to determine the fracture toughness. Tests were performed on an Instron 4411 with a 5 kN load cell at a test speed of 10 mm/min at a temperature of 25° C. At least three specimens were tested for each sample.

The density was measured according to Water Buoyancy Method ASTM D792. Three approximately 1 inch (in.)×1 in. squares were cut from the cured plaque. The edges were polished and a ⅛ in. hole was drilled in the middle of the square. The samples were weighed in air and in water. Deionized air-bubble free water at a temperature of 22° C. was used. The specific gravity is calculated using the following equation.

$$sp \cdot gr \cdot 22/22° C. = \frac{m(\text{air})}{m(\text{air}) - m(\text{water})}$$

The density at 22° C. is estimated with $$\rho^{22° C.} = sp.gr.22/22° C. * \rho_{H_2O}^{22° C.}$$

where the density of water at 22° C. is referenced as 997.9948 kilograms per cubic meter (kg/m$^3$).

Differential scanning calorimetry was used to compute the melting points of the polymeric composites. The differential scanning calorimetry was conducted in a TA instruments DSC-Q1000 at a rate of 10° C./minute using nitrogen as a purging gas.

Table 1 below shows the effect of the low molecular weight compound on the melting point of the polymeric composite. Table 1 shows the melting point for pure IP-60 as well as for the IP-60 containing 5, 10 or 15 wt % pyrene or brominated bisphenol A (tetrabromobisphenol A (TBBA)).

TABLE 1

| Composition | Pure IP-60 | Pyrene (5%) | Pyrene (10%) | Pyrene (15%) | TBBA (5%) | TBBA (10%) | TBBA (15%) |
|---|---|---|---|---|---|---|---|
| Melting point (° C.) | 128 | 126 | 127 | 127 | 126 | 127 | 128 |

From the Table 1, it may be seen that there is no significant variation in the melting temperature of the polymeric composite. Thus, the addition of the low molecular weight compound to the organic polymer produces no adverse effects on the melting point of the polymeric composite and therefore does not adversely affect the processability of the composite.

Table 2 shows the toughness values of the polymeric composite. The toughness values are obtained by measuring the area under the stress-strain curve in a compression test. In other words, the toughness as listed in Table 2 reflects the resilience of the first organic polymer as well as the toughened polymeric composite containing 5, 10 and 15 wt % pyrene or brominated bisphenol A (tetrabromobisphenol A (TBBA)).

TABLE 2

| Composition | Pure IP-60 | Pyrene (5 wt %) | Pyrene (10 wt %) | Pyrene (15 wt %) | TBBA (5 wt %) | TBBA (10 wt %) | TBBA (15 wt %) |
|---|---|---|---|---|---|---|---|
| Toughness ($J/m^3$) | 2.4 | 7.9 | 6.1 | 7.3 | 24.0 | 19.4 | 18.2 |

From Table 2 it may be seen that there is a 200 to 300% improvement in the toughness of the polymeric composite containing pyrene when compared with the toughness displayed by the organic polymer without the pyrene. When brominated bisphenol A is added to the polymeric composite it may be seen that there is a 700 to 900% improvement in the toughness over that of the organic polymer without the brominated bisphenol A.

The FIG. 1 compares the tensile strength and the tensile modulus for the respective polymeric composites when tested as per ASTM D 638. FIGS. 1(a), (b), (c) and (d) show the stress-strain curves for the respective toughened polymeric composites containing high density polyethylene (IP-60) and bisphenol A (BPA) (FIG. 1(a)), brominated bisphenol A (tetrabromobisphenol A (TBBA)) (FIG. 1(b)), phthalic anhydride (PhAn) (FIG. 1(c)) and pyrene (FIG. 1(d)) respectively. From the Figure it can be seen that the samples containing the low molecular weight compounds generally have a larger tensile elongation at break. The tensile elongation at break for the polymeric composite is improved by about 10 to about 600% over the organic polymer (i.e., IP-60) itself. The however does not appear to be any significant decrease in the elastic modulus as a result of the addition of the low molecular weight compounds.

Thus, in summary, it may be seen that there is an improvement in the toughness and tensile elongation properties of the polymeric composite as a result of the addition of the low molecular weight compounds.

Example 2

In this example, polypropylene was chosen as the organic polymer while bisphenol A (BPA), dimethyl terephthalate (DMT) or phthalic anhydride (PhAn) were chosen as the low molecular weight compounds respectively. These samples were prepared in a manner identical with that described in the Example 1. Pellets of polypropylene was dry-blended with each of the aforementioned low molecular weight compounds, followed by melt blending at 200° C. using a laboratory extruder. The laboratory extruder was a C.W. Brabender with a single screw having a length to diameter ratio of 25. The screw diameter was ¾ inch and the extruder was operated at 20 rpm.

The extrudate in the form of a strand was immediately quenched in cooling water maintained at a temperature of 20° C. The strand was chopped into pellets, which were then dried at 80° C. overnight. Sample pellets were then weighed into a mold and subjected to compression molding. Compression molding was conducted by melting the sample at 200° C. under a pressure of 3700 pounds per square inch (psi) for 5 minutes, followed by cooling at 30° C./min while still under the pressure to make a plaque sample.

Each sample was physically aged at room temperature for 2 days before making the appropriate sample geometry (e.g. dog-bone geometry for tensile test, single edge notch bending geometry for fracture toughness test, or the like).

Figure 1A:
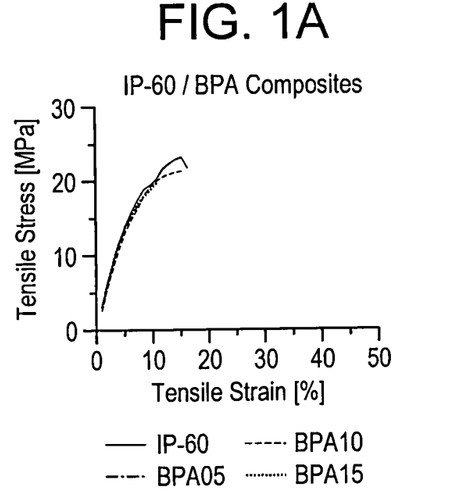
FIGS. 1(a), (b), (c) and (d) show stress-strain curves for the respective toughened polymeric composites that contain high density polyethylene (IP-60) and bisphenol A (BPA) (FIG. 1(a)), brominated bisphenol A (Br-BPA) (FIG. 1(b)), phthalic anhydride (PhAn) (FIG. 1(c)) and pyrene (FIG. 1(d)) respectively.
Figure 1B:
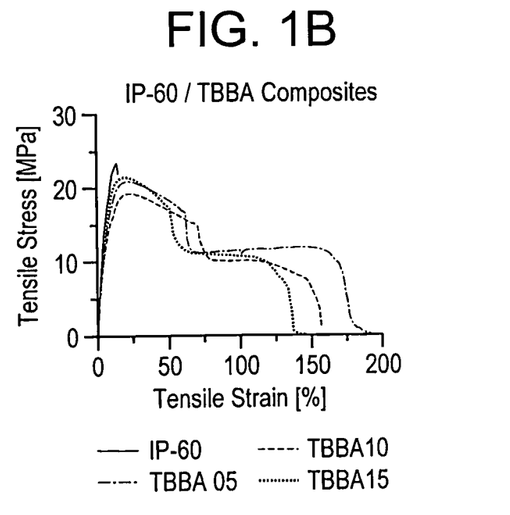
Figure 1C:
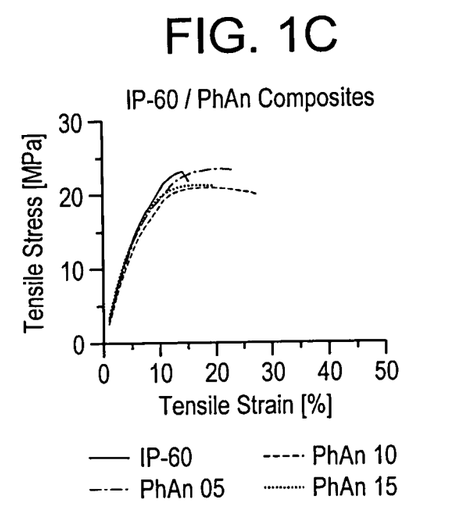
Figure 1D:
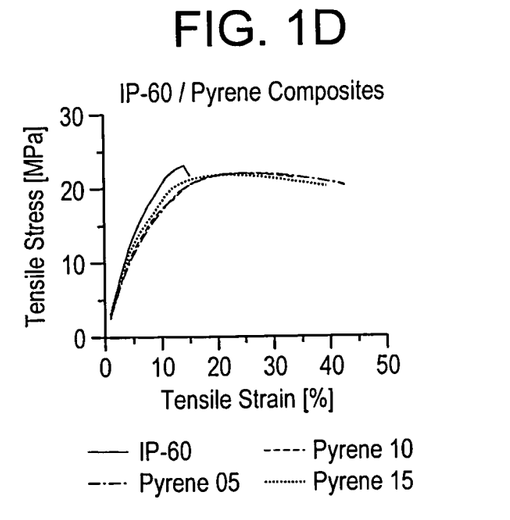
Figure 2:
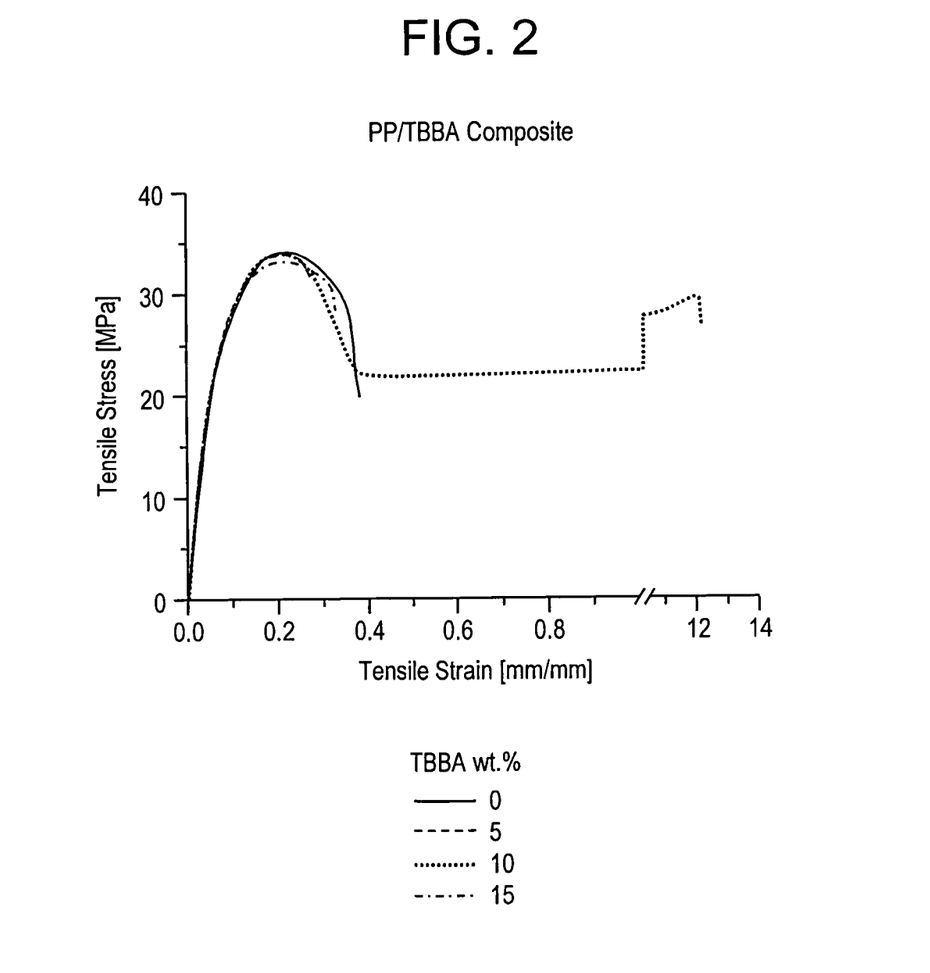
FIG. 2 represents the tensile stress strain curve for toughened polymeric composites containing polypropylene and tetrabromobisphenol A (TBBA)
Figure 3A:
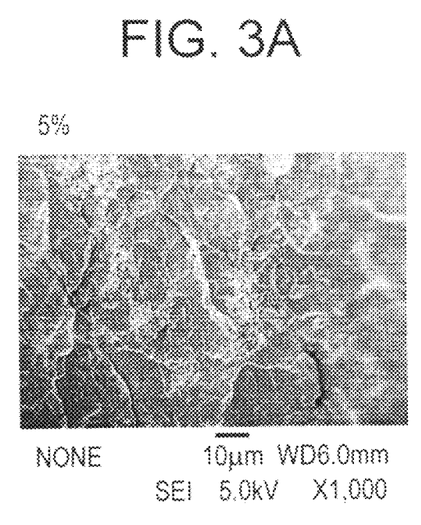
FIGS. 3(a), (b) (c) and (d) represent scanning electron photomicrographs of the cross-section of toughened polymeric composites that contain polypropylene and tetrabromobisphenol A (TBBA); the TBBA is present in amounts of 5, 10, 15 and 20 wt % respectively.
Figure 3B:
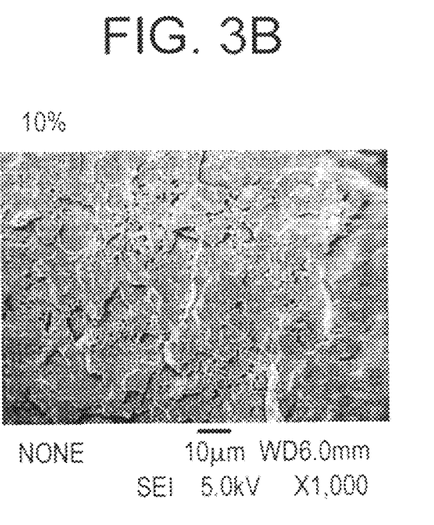
Figure 3C:
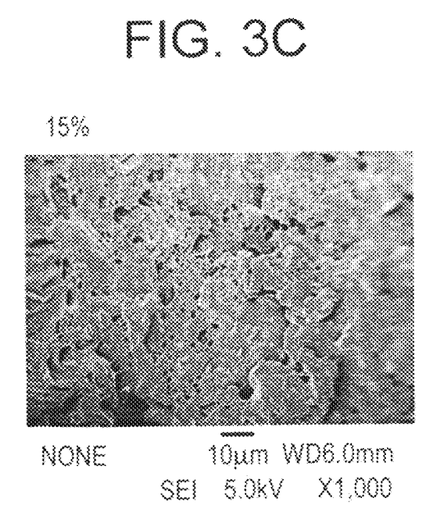
Figure 3D:
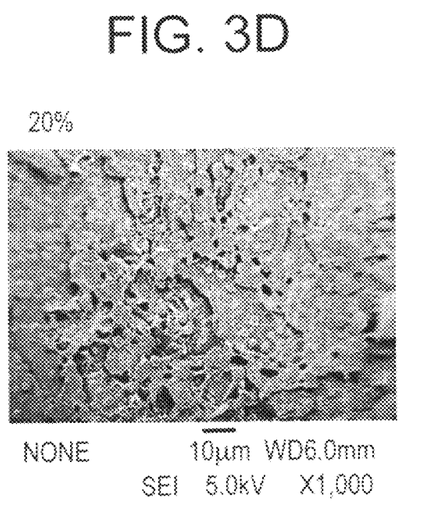

FIG. 2 shows the tensile properties for the polymeric composites comprising polypropylene and brominated bisphenol (tetrabromobisphenol A (TBBA)). The brominated bisphenol was added in amounts of 5, 10 and 15 wt % respectively. From the FIG. 2, it can be seen that there is no reduction in the elastic modulus upon addition of the brominated bisphenol. In addition, the sample containing the 10 wt % brominated bisphenol shows a significantly larger elongation at break than the pure propylene, thereby indicating that the addition of the crystalline low molecular weight compound can produce increased toughness. FIGS. 3(a), (b), (c) and (d) are scanning electron photomicrographs of section of the polymeric composite containing 5, 10, 15 and 20 wt % of the brominated bisphenol respectively. From these figures, it may be seen that there is an increase in the number and size of the domains produced by the crystalline second phase. The domains may be seen as holes in the photomicrographs. This morphology is similar to that seen in rubber toughened impact products.

Figure 4:
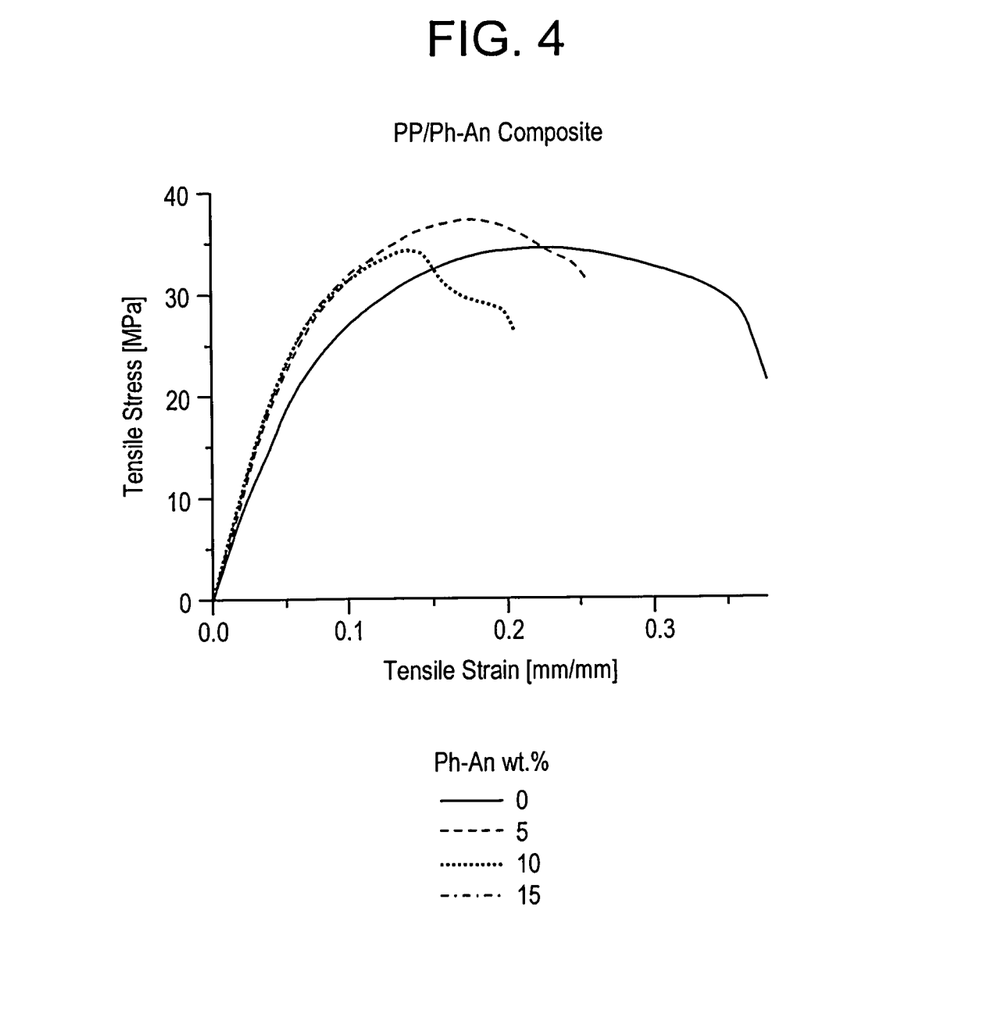
FIG. 4 represents the tensile stress strain curve for toughened polymeric composites containing polypropylene and phthalic anhydride (PhAn)
Figure 5A:
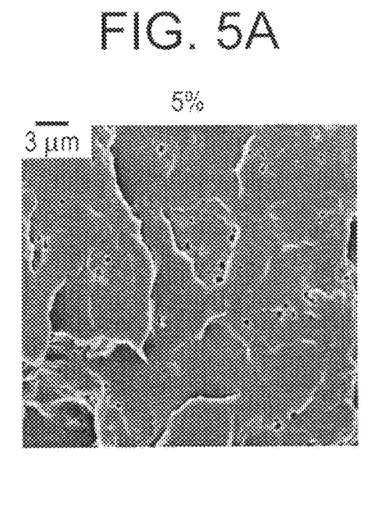
FIGS. 5(a), (b) (c) and (d) represent scanning electron photomicrographs of the cross-section of toughened polymeric composites that contain polypropylene and phthalic anhydride (PhAn); the PhAn is present in amounts of 5, 10, 15 and 20 wt % respectively.
Figure 5B:
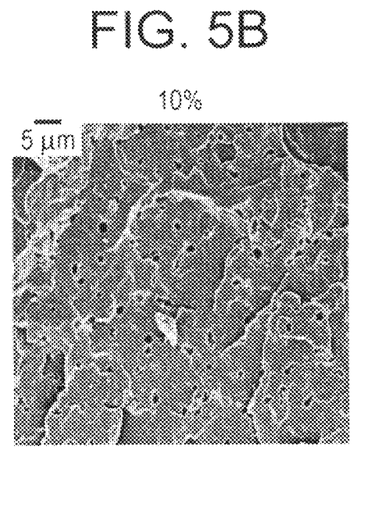
Figure 5C:
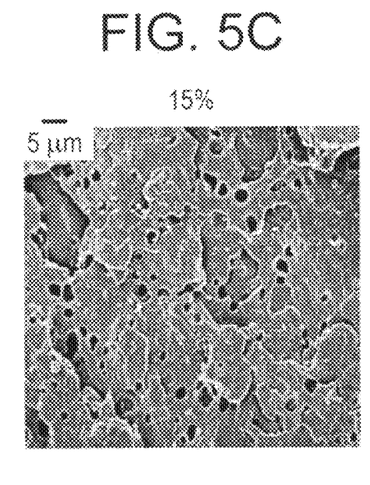
Figure 5D:
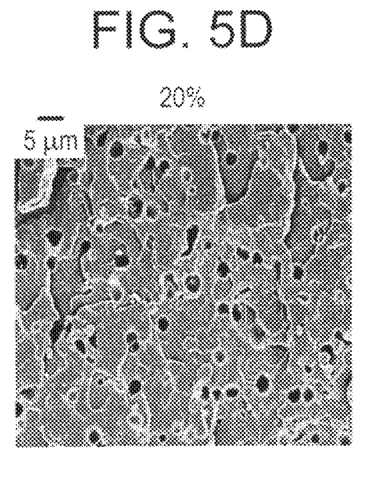
Figure 6A:
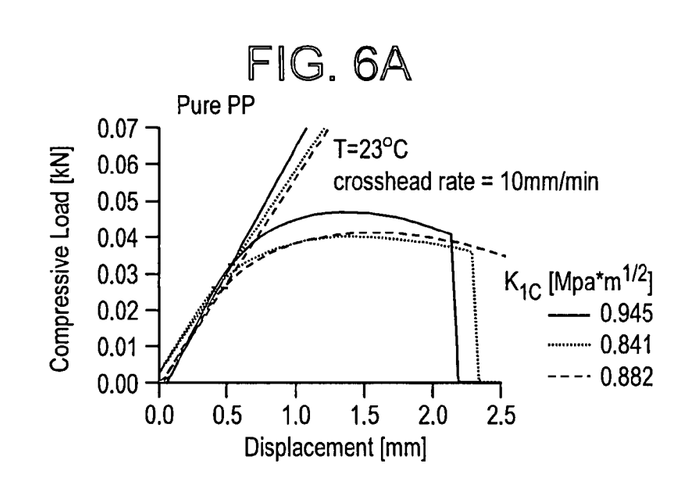
FIGS. 6(a), (b), (c) and (d) show tensile stress-strain curves for pure polypropylene (FIG. 6(a)), polypropylene-phthalic anhydride (95/5) (FIG. 6(b)), polypropylene-phthalic anhydride (90/10) (FIG. 6(c)) and polypropylene-phthalic anhydride (85/15) (FIG. 6(d)) samples respectively.
Figure 6B:
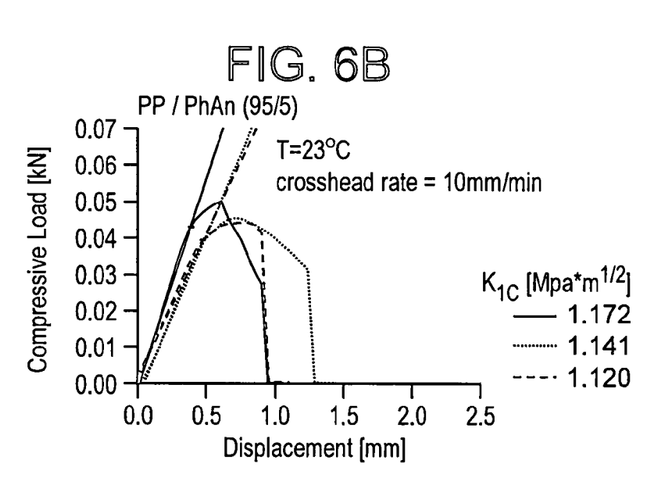
Figure 6C:
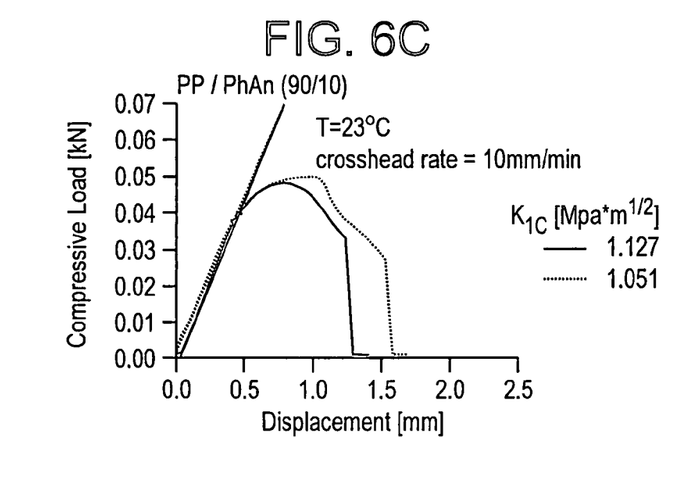
Figure 6D:
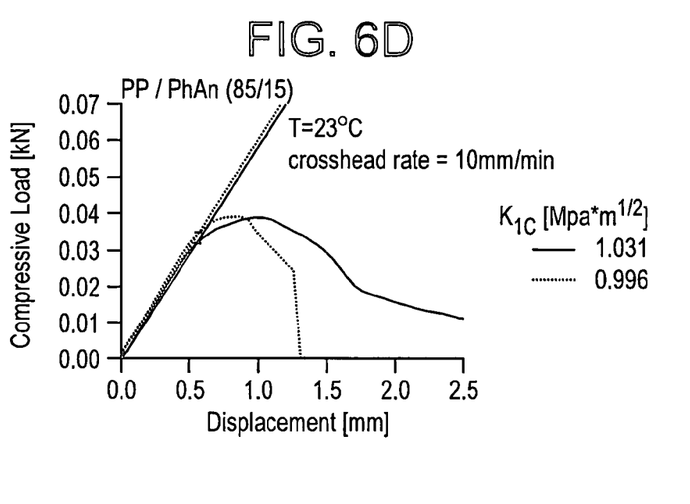

FIGS. 4 and 5 represent the tensile stress strain curve and the cross-sectional morphology for polymeric composites containing polypropylene and phthalic anhydride (PhAn). From the FIG. 4 it can be seen that there is generally an improvement in the yield strength upon the addition of the low molecular weight compound. In addition, there is also an improvement in the elastic modulus of the toughened polymeric composite. Each of the FIGS. 5(a), (b), (c) and (d) depict scanning electron photomicrographs that were taken of the cross-sections of the respective fractured samples. The FIGS. 5(a), (b), (c) and (d) shows the cross-section of a fractured sample that contains 5 wt %, 10 wt %, 15 wt % or 20 wt % PhAn and polypropylene respectively. Each of the FIGS. 5(a), (b), (c) and (d) show morphologies that compare favorably with conventional rubber toughened polymeric composites.

FIG. 6 shows toughness properties for samples containing polypropylene and for the samples containing polypropylene and PhAn. FIG. 6(a) shows a compressive load-displacement curve for samples containing only polypropylene, while the FIGS. 6(b), (c) and (d) show a compressive load-displacement curve for the polymeric composites that contain 5, 10 or 15 wt % of phthalic anhydride. From the compressive load-displacement curves it may be seen that the toughness of the samples is increased upon adding the crystalline low molecular weight compounds to the polypropylene.

Figure 7:
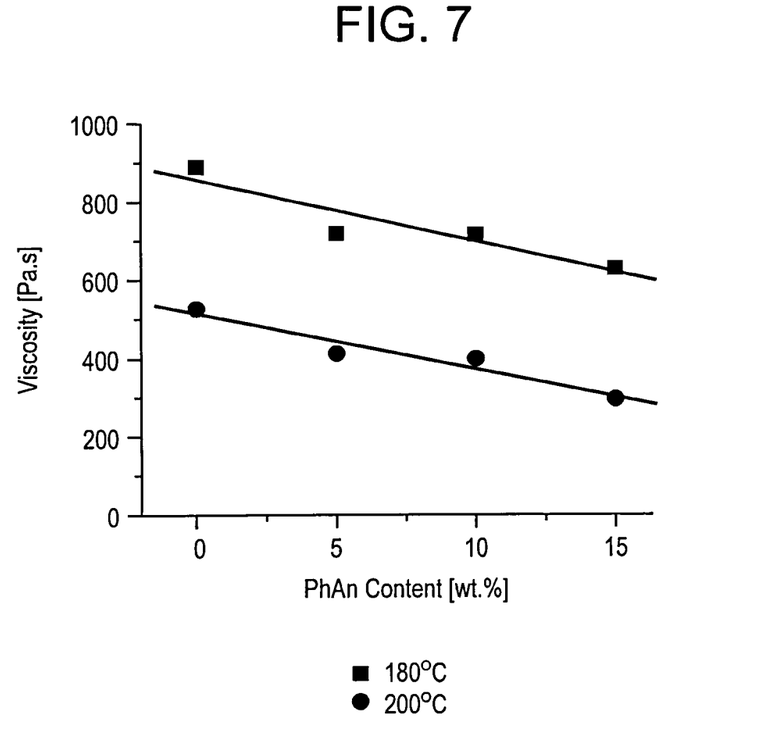
FIG. 7 graphically depicts melt viscosities for the polymeric composite containing polypropylene and PhAn at different concentrations.

FIG. 7 graphically depicts melt viscosities for the polymeric composite containing polypropylene and PhAn. It can be seen that the addition of PhAn lowers melt viscosity, which facilitates ease of processing. From the FIG. 7 it may be sent that the addition of increasing amounts of PhAn lowers the melt viscosity at temperatures of 180 and 200° C. respectively.

Example 3

This example was performed to demonstrate that reaction induced phase separation can be used to facilitate impact toughening of the first organic polymer. This example also demonstrates the impact toughening can be performed on a first organic polymer that comprises a thermosetting resin. The thermoset resin is a Shell EPON 828 DGEBA epoxy system cured with 1,3 phenylenediamine (PDA). The dispersed second phase comprised a low molecular weight crystallizable compound—dimethylsulfone (DMS) obtained from Aldrich chemical company. Dimethylsulfone has a melting point of 107° C. Three compositions containing 15, and 25 wt % of the dimethylsulfone were manufactured. As can be seen in the FIG. 8, the compositions were heated to 130° C. and were then cooled to a temperature of 50° C., where they were held for about 2.7 hours.

Figure 8:
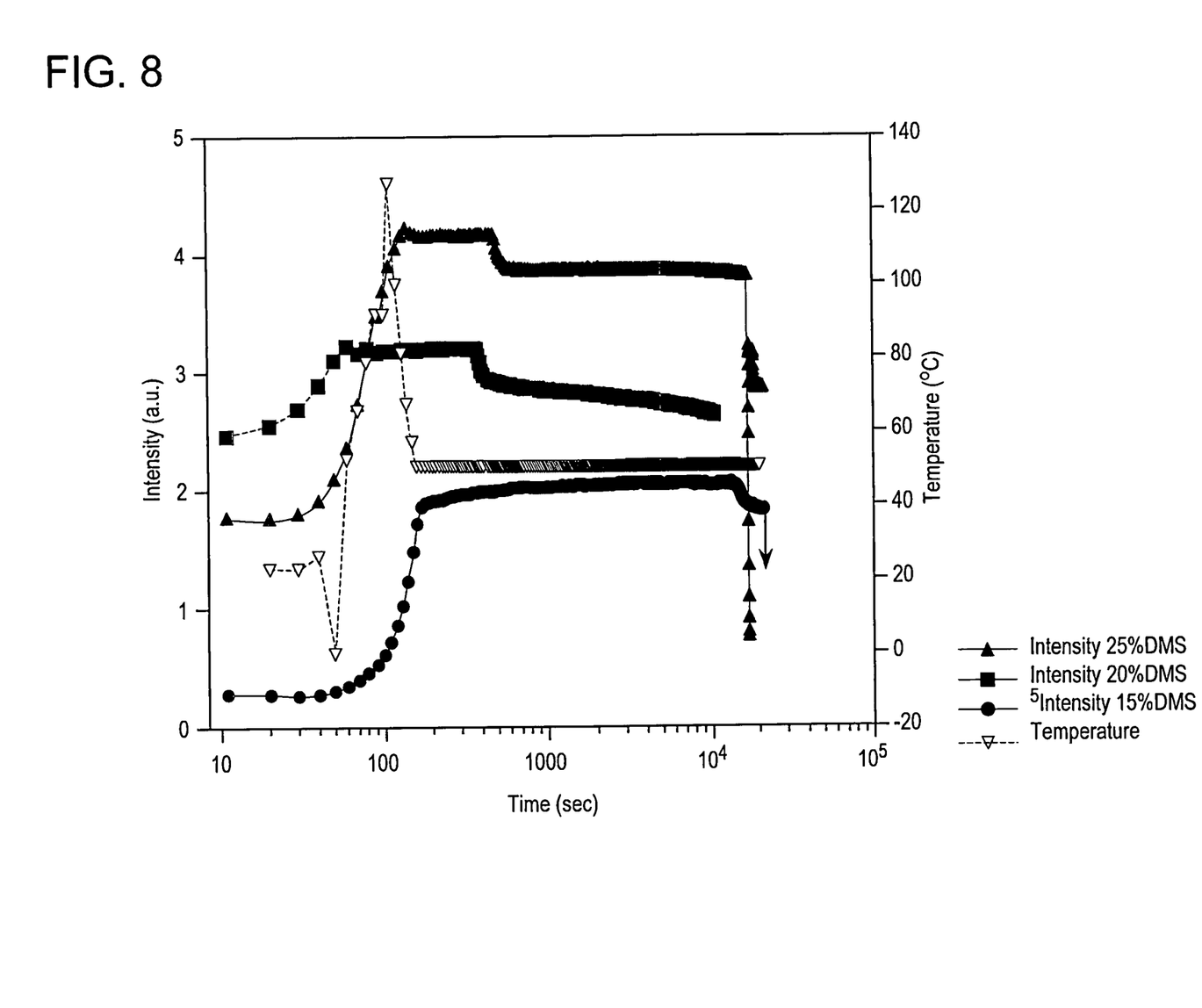
FIG. 8 is a graphical representation of small-angle light scattering results on a polymeric composite formed using reaction induced phase separation (RIPS) at an isothermal temperature of 50° C. using varying concentrations of dimethylsulfone (a crystallizable compound) in an epoxy.
Figure 9:
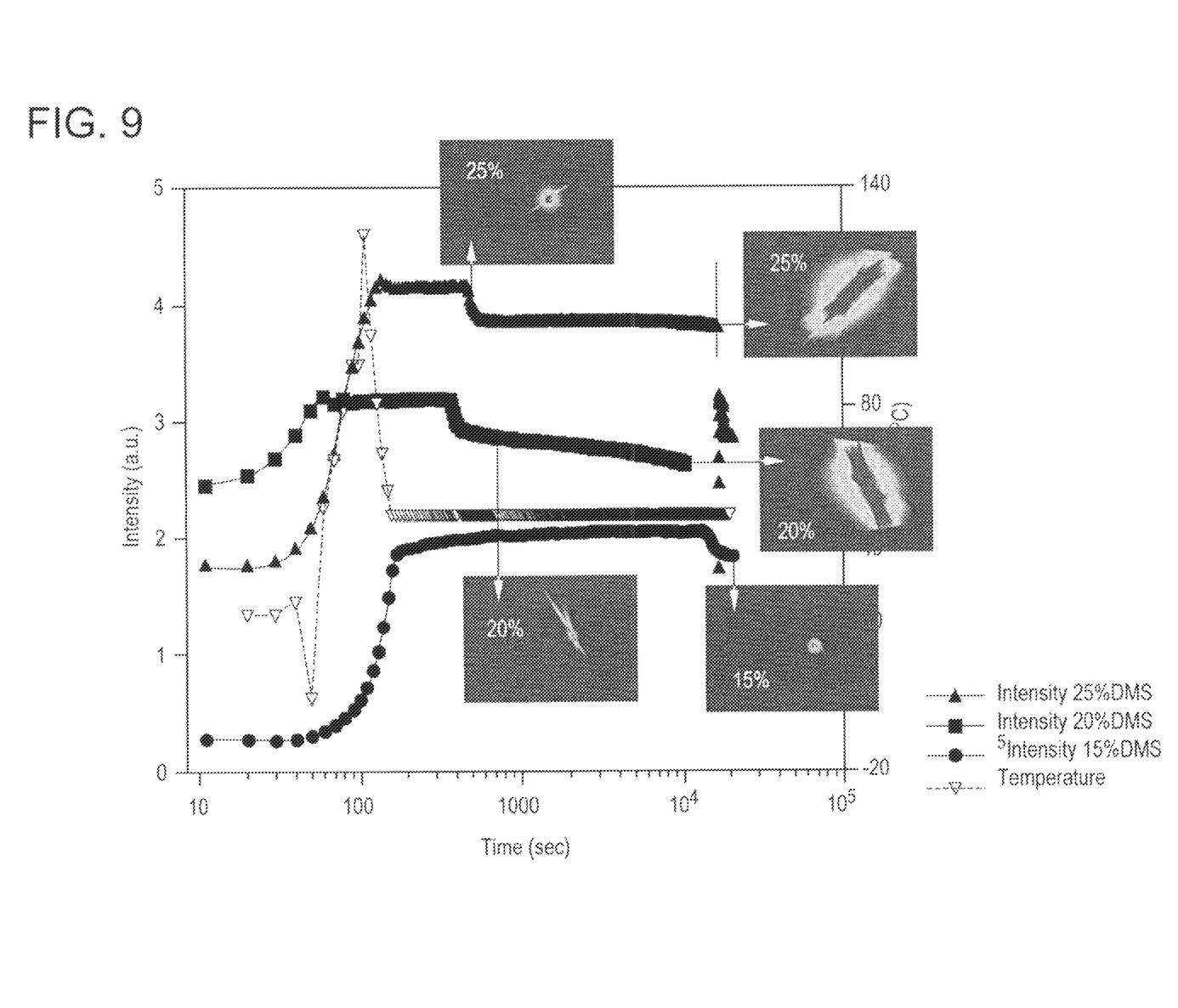
FIG. 9 is a graphical representation of small-angle light scattering results that shows small-angle light scattering results as well as photomicrographs; the data was obtained on a polymeric composite formed using reaction induced phase separation (RIPS) at an isothermal temperature of 50° C. using varying concentrations of dimethylsulfone in an epoxy.

FIGS. 8 and 9 show small-angle light scattering results on a composite resins formed using reaction induced phase separation (RIPS) that were produced at an isothermal temperature of 50° C. using varying concentrations of a crystallizable compound. The FIG. 8 is a graphical representation of the small-angle light scattering results, while the FIG. 9 is a composite representation of images as well as data obtained during the small-angle light scattering experiments.

As can be seen in the FIG. 8, the scattering intensity increases to the point of melting of each compound and then decreases at a point where phase separation begins. The decrease in the scattering intensity is brought about by the crystallization of the dimethylsulfone during the reduction in temperature to 50° C. The decrease in the intensity of scattering also occurs during the isothermal crystallization at 50° C. This plot illustrates the time for phase separation to occur at 50° C. using this system. The inset pictures are maps of the scattering pattern discussed in the next paragraph and shown again in FIG. 10.

Figure 10:
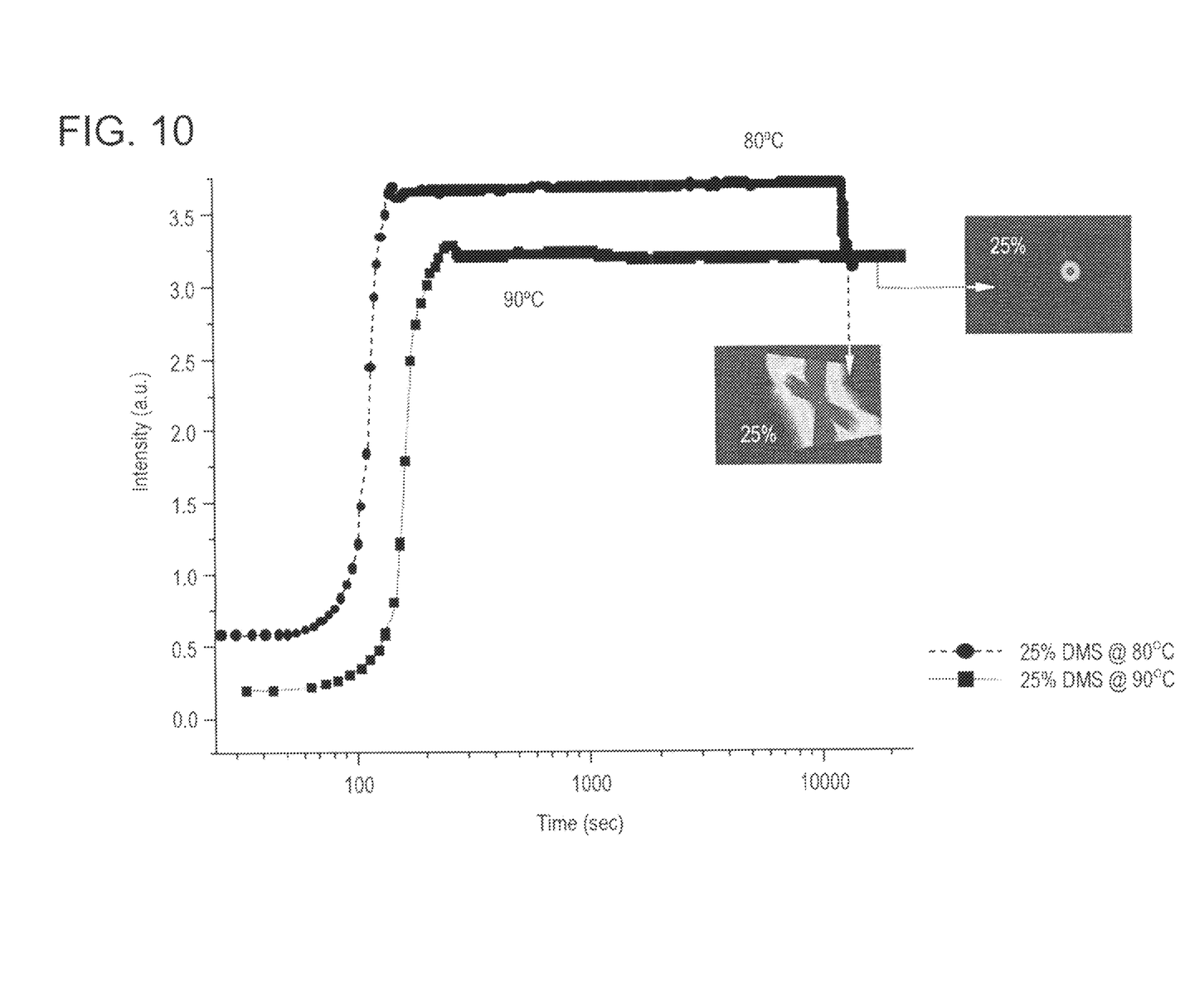
FIG. 10 shows the formation of small angle light scattering patterns of the epoxy resin system reinforced with dimethylsulfone at a concentration of 25 weight percent. At 80° C., the phase separation occurs so as to produce crystallites on the order of about 5 to about 10 micrometers in size.
Figure 11:
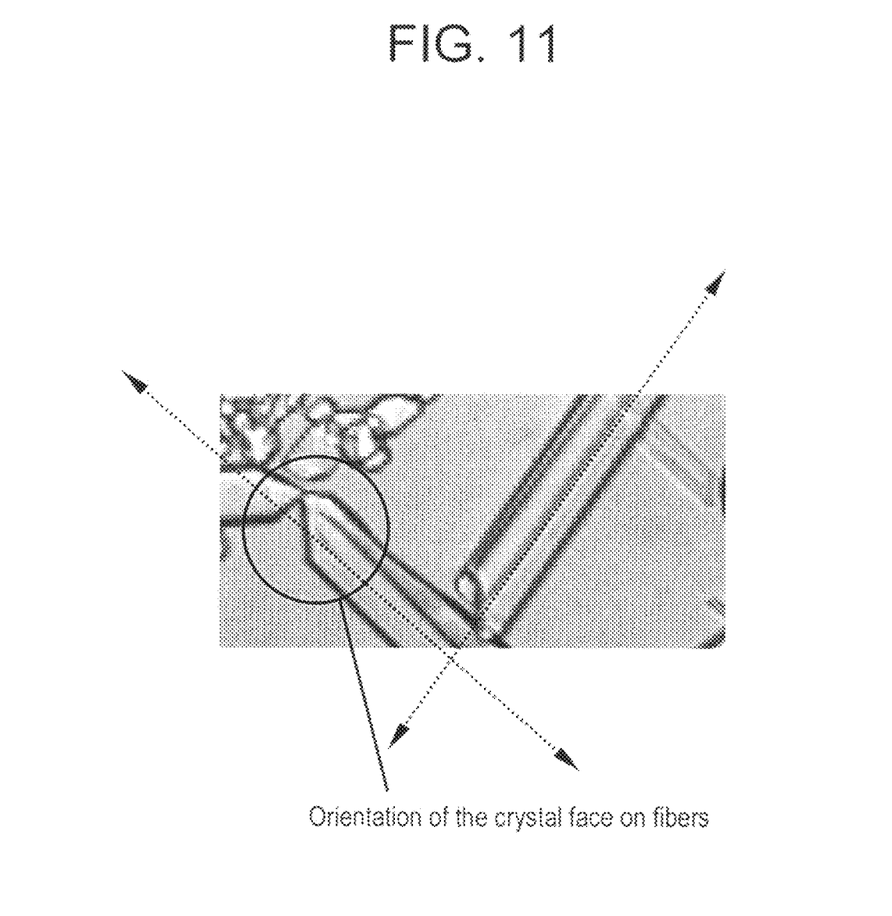
FIG. 11 is a photograph that shows optical micrographs of fiber of dimethylsulfone generated in-situ at 80° C.

FIG. 10 shows the formation of small angle light scattering patterns of the EPON 828, PDA resin system reinforced with dimethylsulfone. The amount of dimethylsulfone is about 25 weight percent. At 80° C., the phase separation occurs so as to produce crystallites on the order of about 5 to about 10 micrometers in size FIG. 11 is a photograph that shows optical micrographs of the fibers generated in-situ at 80° C.

Thus in summary, it may be seen that the addition of the low molecular weight compound to the organic polymer produces improved tensile strength at break, elongations at break and improved toughness. In some cases there is an improvement in the elastic modulus. The melt viscosity is generally reduced thus facilitating ease of processing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A polymeric composite comprising:
a first organic polymer that forms a first organic polymer phase, the first organic polymer being present in an amount of about 70 to about 98 weight percent, based upon the total weight of the polymeric composite;
a low molecular weight compound that exists in the form of a second phase; the second phase being a crystalline phase; wherein the second phase is dispersed within the first organic polymer phase, further wherein the low molecular weight compound is incompatible with the first organic polymer.

2. The polymeric composite of claim 1, wherein the first organic polymer is semi-crystalline or amorphous.

3. The polymeric composite of claim 1, wherein the first organic polymer is a thermoplastic, a thermoset, a blend of thermoplastic polymers, a blend of thermosetting polymers, or a blend of a thermoplastic polymer with a thermoset polymer.

4. The polymeric composite of claim 1, wherein the first organic polymer is a blend of polymers, copolymers, terpolymers, or a combination comprising at least one of the foregoing organic polymers.

5. The polymeric composite of claim 1, wherein the first organic polymer is an oligomer, a homopolymer, a copolymer, a block copolymer, an alternating block copolymer, a random polymer, a random copolymer, a random block copolymer, a graft copolymer, a star block copolymer, a dendrimer, or a combination comprising at last one of the foregoing organic polymers.

6. The polymeric composite claim 1, wherein the first organic polymer is polyacetal, polyolefin, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, polyethylene terephthalate, polybutylene terephthalate, polyurethane, polytetrafluoroethylene, fluorinated ethylene propylene, perfluoroalkoxyethylene, polychlorotrifluoroethylene, polyvinylidene fluoride, or a combination comprising at least one of the foregoing organic polymers.

7. The polymeric composite of claim 1, comprising the low molecular weight compound in an amount of about 2 to about 30 weight percent, based upon the total weight of the polymeric composite.

8. The polymeric composite of claim 1, wherein the low molecular weight compound undergoes crystallization at a temperature of up to about 200° C.

9. The polymeric composite of claim 1, wherein the low molecular weight compound is crystalline at room temperature.

10. The polymeric composite of claim 1, wherein the low molecular weight compound can comprise organic and inorganic moieties.

11. The polymeric composite of claim 1, wherein the low molecular weight compound is a polymer precursor.

12. The polymeric composite of claim 1, having a tensile strength at break that is greater than the tensile strength of the first organic polymer without the low molecular weight compound, when tested as per ASTM D 638 and a melt viscosity that is lower than the melt viscosity of the first organic polymer without the low molecular weight compound.

13. The polymeric composite of claim 1, having an elongation at break that is greater than the elongation at break of the first organic polymer without the low molecular weight compound, when tested as per ASTM D 638 and a melt viscosity that is lower than the melt viscosity of the first organic polymer without the low molecular weight compound.

14. The polymeric composite of claim 1, having an impact toughness that is greater than the impact toughness of the first organic polymer without the low molecular weight compound, when tested as per ASTM D 5045-99 and a melt viscosity that is lower than the melt viscosity of the first organic polymer without the low molecular weight compound.

15. The polymeric composite of claim 1, having a tensile strength at break that is greater than the tensile strength of the first organic polymer without the low molecular weight compound, when tested as per ASTM D 638, an elongation at break that is greater than the elongation at break of the first organic polymer without the low molecular weight compound, when tested as per ASTM D 638 and an impact toughness that is greater than the impact toughness of the first organic polymer without the low molecular weight compound, when tested as per ASTM D 5045-99.

16. The polymeric composite of claim 1, having an elastic modulus that is greater than the elastic modulus of the first organic polymer without the low molecular weight compound when measured as per ASTM D 638 and an impact toughness that is greater than the impact toughness of the first organic polymer without the low molecular weight compound, when tested as per ASTM D 5045-99 and a melt viscosity that is lower than the melt viscosity of the first organic polymer without the low molecular weight compound.

17. The polymeric composite of claim 1, further comprising a third phase and/or a fourth phase, wherein the third phase and the fourth phase both comprise low molecular weight compounds that have a different chemical structure from one another.

* * * * *